UNITED STATES PATENT OFFICE.

STEPHEN J. HAYDE, OF KANSAS CITY, MISSOURI.

FIRE AND WATER PROOFING COMPOSITION.

No. 803,285.      Specification of Letters Patent.      Patented Oct. 31, 1905.

Application filed June 10, 1905. Serial No. 264,567.

*To all whom it may concern:*

Be it known that I, STEPHEN J. HAYDE, a citizen of the United States, residing at Kansas City, in the county of Jackson and State of Missouri, have invented certain new and useful Improvements in Fire and Water Proofing Compositions, of which the following is a specification.

My invention relates to improvements in fire and water proofing compositions suitable for covering walls, columns, girders, &c., and it may be applied in a plastic state directly to the surfaces to be protected or be molded into blocks of convenient size for handling and of proper shape to conform to the surfaces to be covered.

My object is to provide a composition which is both fireproof and impervious to water, so that when subjected to the flames of a burning building and the water thrown thereon it will neither crack nor crumble, but will remain intact and protect the surfaces to which it is applied. When applied directly to the metal superstructure of a building, it will exclude all moisture therefrom, and thus eliminate all danger to said superstructure from becoming weakened by rust, to which superstructures of this character are more or less subjected.

The absence of metal in the ingredients, the aluminium in the clay being reduced by heat, renders the composition an excellent non-conductor of electricity, and thus protects the superstructure from electrical attacks and consequent electrolysis.

The composition consists of the ingredients hereinafter mentioned in substantially the proportions set forth, it being understood that I do not restrict myself to the exact proportions stated, but reserve the right to vary the same within reasonable limits.

Formula: Portland cement, one part; powdered burnt clay, one part; coarse burnt clay, three parts; mineral wool, one part. These ingredients in approximately the proportions mentioned are thoroughly mixed together in a dry state and are then reduced to the desired consistency by water, so that they may be introduced into a mold of proper size and shape or applied directly to the surface to be protected.

The clay employed is ordinary brick-clay, which is burned until any foreign organic matter it may contain is destroyed. It is then subjected to the action of a crusher until partly reduced to the size of gravel, the other portion being reduced to a powder. The coarse burnt clay gives body to the composition, while the pulverized clay and the Portland cement bind the coarse particles together.

The use of mineral wool is not essential, though desirable, as it diminishes the weight of the composition. Good results, however, are attainable without the use of any mineral wool, and when omitted the coarse burnt clay is increased one part to give the composition its proper bulk. I may also omit powdered burnt clay in some forms of my composition.

I am aware that Acme cement and clay have been used in fireproofing compositions; but the cement above named will crack and crumble when subjected to the action of heat and water, while sand usually forms a component part of said compositions, and, as sand will liquefy when exposed to heat, compositions containing these ingredients fail in the purpose for which they are intended.

Having thus described my invention, what I claim, and desire to secure by Letters Patent, is—

1. The herein-described composition of matter consisting of Portland cement and coarse burnt clay.

2. The herein-described composition of matter consisting of Portland cement, coarse burnt clay and water 3. The herein-described composition of matter consisting of Portland cement, powdered burnt clay and coarse burnt clay.

4. The herein-described composition of matter consisting of Portland cement, powdered burnt clay, coarse burnt clay and water.

5. The herein-described composition of matter consisting of Portland cement one part, powdered burnt clay one part, and coarse burnt clay four parts 6. The herein-described composition of matter consisting of Portland cement one part, powdered burnt clay one part, coarse burnt clay four parts, and sufficient water to form a mortar.

7. The herein-described composition of matter consisting of Portland cement, powdered burnt clay, mineral wool and coarse burnt clay.

8. The herein-described composition of matter consisting of Portland cement, powdered burnt clay, mineral wool, coarse burnt clay and water.

9. The herein-described composition of matter consisting of Portland cement one part, powdered burnt clay one part, mineral wool one part, and coarse burnt clay three parts.

10. The herein-described composition of matter consisting of Portland cement one part, powdered burnt clay one part, mineral wool one part, coarse burnt clay three parts, and sufficient water to form a mortar.

In testimony whereof I affix my signature in the presence of two witnesses.

STEPHEN J. HAYDE.

Witnesses:
F. G. FISCHER,
J. MOORE.